United States Patent [19]
Gitlitz et al.

[11] 3,892,863
[45] July 1, 1975

[54] METHOD FOR COMBATING FUNGI AND MITES USING TRIS(CYCLOHEXYL-ALKYL) TIN COMPOUNDS

[75] Inventors: Melvin H. Gitlitz; Bernard G. Kushlefsky, both of Edison, N.J.

[73] Assignee: M & T Chemicals Inc., Greenwich, Conn.

[22] Filed: July 16, 1973

[21] Appl. No.: 379,744

Related U.S. Application Data

[62] Division of Ser. No. 295,137, Oct. 5, 1972, Pat. No. 3,790,611.

[52] U.S. Cl. .............. 424/288; 424/168; 424/357
[51] Int. Cl. ............................................. A01n 9/00
[58] Field of Search ................................. 424/288

[56]  References Cited
UNITED STATES PATENTS

| | | | |
|---|---|---|---|
| 3,264,177 | 8/1966 | Kenaga | 424/288 |
| 3,288,669 | 11/1966 | Hechenbleikner | 424/288 |
| 3,344,019 | 9/1967 | Iowa | 424/288 |
| 3,542,824 | 11/1970 | Bublitz | 424/288 X |
| 3,544,608 | 12/1970 | Pande | 424/288 |
| 3,591,614 | 7/1971 | Bublitz | 424/288 |
| 3,591,615 | 7/1971 | Bublitz | 424/288 |
| 3,609,173 | 9/1971 | Kushlefsky | 424/288 |
| 3,657,451 | 4/1972 | Horne, Jr. | 424/288 |

Primary Examiner—Albert T. Meyers
Assistant Examiner—Dale R. Ore
Attorney, Agent, or Firm—Robert P. Auber; Kenneth G. Wheeless; Robert Spector

[57]  ABSTRACT

Triorganotin compounds of the general formulae

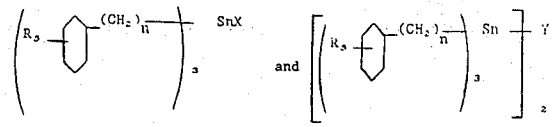

are novel and effectively combat a variety of undesirable organisms, including fungi and mites when applied to objects, particularly plants, that are susceptible to attack by these organisms. In the foregoing formulae each R is individually selected from hydrogen and lower alkyl radicals, X is a chlorine, bromine, fluorine, hydroxyl, carboxylate, phenoxy, alkoxy (—OR′) or mercaptide (—SR′) radical wherein R′ represents an alkyl or aryl radical containing between 1 and 12 carbon atoms, inclusive; Y is an oxygen, sulfur, or a sulfate radical and $n$ represents an integer between 1 and 5, inclusive.

6 Claims, No Drawings

METHOD FOR COMBATING FUNGI AND MITES USING TRIS (CYCLOHEXYLALKYL) TIN COMPOUNDS

This application is a divisional application of co-pending application Ser. No. 295,137 filed Oct. 5, 1972, now U.S. Pat. No. 3,790,611.

BACKGROUND

This invention relates to novel triorganotin compounds and to a method for selectively controlling fungi, mites and other undesirable organisms using these triorganotin compounds. The organisms against which the compounds are effective are responsible for a considerable portion of the annual damage to agricultural crops, particularly tomatoes, apples, and rice. Over the years fungi and mites have developed a resistance to many chemicals which had previously been effective in combating them. The development of resistant strains has mandated a search for new miticides and fungicides. Some triorganotin compounds effectively control these pests; however, with few exceptions this class of compounds is relatively non-selective when applied to desirable plant crops, in that while the organism attacking the plant may be controlled, the plant itself is often killed or severely damaged.

SUMMARY OF THE INVENTION

It has now been found that certain novel tris(cyclohexylalkyl)tin derivatives of the general formula

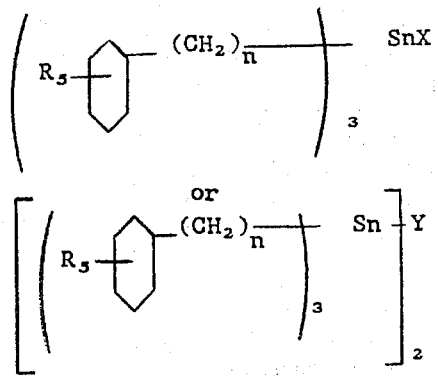

effectively control fungi and mites yet do not substantially damage plants to which efficacious amounts of these compounds have been applied. In the foregoing formula, each R is individually selected from the group consisting of hydrogen atoms and linear and branched alkyl radicals containing between 1 and 8 carbon atoms, X represents a radical selected from the group consisting of chlorine, bromine, fluorine, hydroxyl, carboxylate, phenoxy, alkoxy ($-OR'$), and mercaptide ($-SR'$) wherein $R'$ represents an alkyl or aryl radical containing between 1 and 12 carbon atoms, inclusive; Y is an oxygen, sulfur, or sulfate radical and $n$ represents an integer between 1 and 5, inclusive.

DETAILED DESCRIPTION OF THE INVENTION

The triorganotin compounds of this invention wherein X is bromine are conveniently prepared by reacting the appropriate tris(cyclohexylalkyl) monoorganotin compound with bromine. This is a well known type of reaction and has been described in the chemical literature for the preparation of numerous other triorganotin derivatives.

Tetraorganotin compounds which can be employed to prepare the compounds of this invention exhibit the generic formula

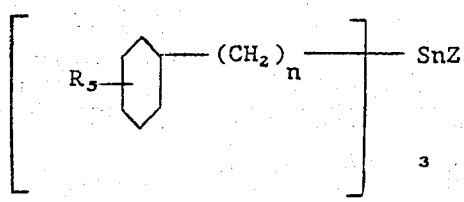

wherein Z is a hydrocarbon radical selected from the group consisting of

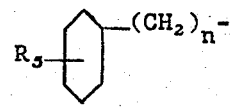

alkyl and alkenyl, the latter two radicals containing 1 to 8 carbon atoms, and phenyl. Preferably the tetraorganotin compound is dissolved in a suitable solvent or mixture of solvents to which a solution of bromine is gradually added. Suitable solvents include alcohols containing between 1 and 8 carbon atoms and halogenated hydrocarbons. Any liquid which does not freeze at the reaction temperature and does not react with bromine can be employed as a solvent for the tetraorganotin compound. The temperature of the reaction mixture is maintained below ambient temperature, preferably between $-30°$ and $25°C$., during addition of the bromine to control the degree of hydrocarbon radical cleavage, thereby maximizing the yield of desired product. The reaction is believed to proceed in accordance with the following formula:

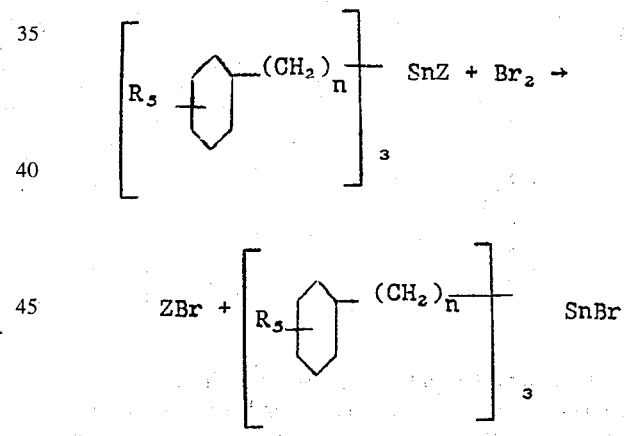

The resultant tris(cyclohexylalkyl)tin bromides are liquids or solids at ambient temperature and can readily be converted to other derivatives such as the oxide or hydroxide, acetate, and sulfate using known reactions. The desired anionic radical can be introduced by reacting the corresponding bromide, oxide, or hydroxide with the reagent indicated in the following table.

| ORGANOTIN DERIVATIVE + | REAGENT | DESIRED PRODUCT |
|---|---|---|
| Bromide | carboxylic acid + acid acceptor, e.g. pyridine | carboxylate, e.g. acetate |
| Bromide | alkali metal salt of acid | carboxylate, e.g. acetate |
| Bromide | alkali metal alkoxide or alcohol + acid acceptor | alkoxide |
| Bromide | alkali metal phenoxide or phenol + acid acceptor | phenoxide |

-Continued

| ORGANOTIN DERIVATIVE + REAGENT | | → DESIRED PRODUCT |
|---|---|---|
| Bromide | potassium fluoride or hydrofluoric acid | fluoride |
| Bromide | alkali metal sulfide | sulfide |
| Bromide | alkali metal sulfate | sulfate |
| Bromide | mercaptan + acid acceptor | mercaptide |
| Oxide (or hydroxide) | carboxylic acid or anhydride | carboxylate |
| Oxide (or hydroxide) | alcohol (or phenol) | alkoxide (or phenoxide) |
| Oxide (or hydroxide) | hydrofluoric acid | fluoride |
| Oxide (or hydroxide) | dilute (10–25 weight %) aqueous sulfuric acid | sulfate |
| Oxide (or hydroxide) | hydrogen sulfide | sulfide |
| Oxide (or hydroxide) | alkyl or aryl mercaptan | mercaptide |
| Oxide (or hydroxide) | aqueous hydrochloric acid | chloride |

The reaction conditions such as preferred solvents, temperatures and reaction times for preparing the derivatives summarized in the previous table are known in the art and, therefore, do not reqiure a detailed description in the present specification. A comprehensive treatment of this subject matter is contained in an article by R. K. Ingham et al. that appeared in the October, 1960 issue of CHEMICAL REVIEWS (p.p. 459–539).

The tris(cyclohexylalkyl)tin derivatives of this invention exhibit the generic formula

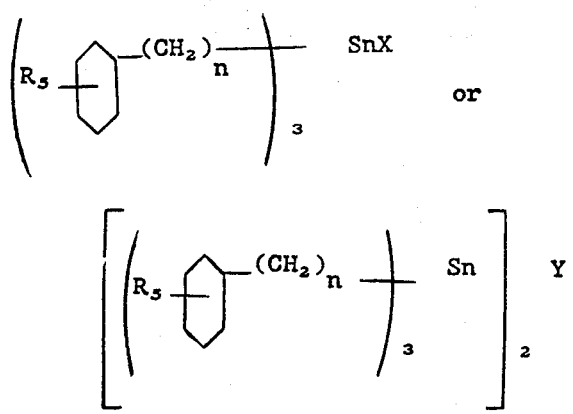

wherein each R is individually selected from hydrogen atoms and linear or branched alkyl hydrocarbon radicals containing between 1 and 8 carbon atoms; X represents a monovalent radical selected from chlorine, bromine, fluorine, hydroxyl, carboxylate

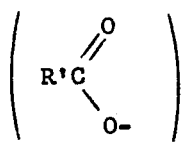

alkoxy (—OR'), mercaptide (—SR'), and phenoxy wherein R' is as previously defined; Y represents a divalent radical selected from oxygen, sulfur and sulfate, and $n$ is an integer between 1 and 5 inclusive.

The compounds are liquids or solid materials at ambient temperature, depending upon the type of substituents represented by R, Y, and Z and the value of $n$.

The triorganotin compounds of this invention effectively combat a variety of undesirable organisms including mites and fungi without significantly damaging the plants to which the compounds are applied. A single application of the compounds can provide residual and extended control of fungi, mites, and other organisms over a period of time, the duration of which is dependent to some extent upon mechanical and biological influences, including weather, but is sometimes as long as several months.

In preparing compositions for application to plants the tin compound is often augmented or modified by combining it with one or more commonly employed pesticide additives or adjuvants including organic solvents, water or other liquid carriers, surface active dispersing agents or particulate and finely comminuted or divided solids. Depending upon the concentration of the tin compound in the composition, the latter can be employed directly to control undesirable fungi, mites, and other organisms or as concentrates which are subsequently diluted with additional inert carrier to produce the ultimate treating compositions. In compositions to be employed as concentrates, the tin-containing toxicant can be present at a concentration of from about 5 to about 98 percent by weight. Baits, attractants and the like can also be included for combatting mites. Other biologically active agents that are chemically compatible with the present tin compounds can also be added.

The optimum concentration of tin compounds to be employed in a composition for application to the organism directly or by employing its habitat or food as carrier, may vary provided that the organism is contacted with an effective dose of toxicant. The actual weight of compound constituting an effective dose may vary, and is primarily dependent upon the susceptibility of a particular organism to the tin compound. In general, good results are obtained with liquid compositions containing at least 0.003 percent by weight of toxicant. Compositions containing as high as 90 percent by weight of toxicant can sometimes be employed in the treatment of environments of food baits for the mites. With dusts, good results are obtained using compositions containing from 0.01 to 80 percent or more by weight of toxicant. Where the compositions are to be applied to living plants, it is preferred that the toxicant be present in an amount between about 20 and 90 percent by weight in liquid compositions and between about 5 to 80 percent in dusts.

In the preparation of dust compositions, the tin compound can be blended with many commonly employed finely divided solids, such as fuller's earth, attapulgite, bentonite, pyrophyllite, vermiculite, diatomaceous earth, talc, chalk, gypsum, wood flour, and the like. In such operations, the finely divided carrier is ground or mixed with the toxicant or wetted with a dispersion of the toxicant in a volatile liquid. Depending upon the proportions of ingredients, these compositions can be employed as concentrates and subsequently diluted with additional solid of the sort indicated, to obtain the desired amount of active ingredient in a comminuted composition adapted for the control of pests. Also, such concentrate dust compositions can be incorporated in intimate admixture with surface active dispersing agents such as ionic or non-ionic emulsifying or dispersing agents to form spray concentrates. Such concentrates are readily dispersible in liquid carriers to form spray compositions or liquid formulations containing the toxicants in any desired amount. The choice of surface active agent and amount thereof employed are determined by the ability of the agent to facilitate the dispersing of the concentrate in the liquid carrier to produce the desired liquid composition. Suitable liquid carriers include water, methanol, ethanol, isopropanol, methyl ethyl ketone, acetone, methylene chloride, chlorobenzene, toluene, xylene, and petroleum distillates. Among the preferred petroleum distillates are those boiling almost entirely under 400°F. at atmospheric pressure and having a flash point above about 80°F.

Alternatively, the toxicant may be compounded with a suitable water-immiscible organic liquid and a surface active dispersing agent to produce emulsifiable concentrates which may be further diluted with water and oil to form spray mixtures in the form of oil-in-water emulsions. In such compositions, the carrier comprises an aqueous emulsion, i.e. a mixture of water-immiscible solvent, emulsifying agent and water. Preferred dispersing agents which may be employed in these compositions are oil soluble and include the condensation products of alkylene oxides with phenols and organic and inorganic acids, polyoxyethylene derivatives of sorbitan esters, alkylarylsulfonates, complex ether alcohols, mahogany soaps and the like. Suitable organic liquids to be employed in the compositions include petroleum distillates, hexanol, liquid halohydrocarbons and synthetic organic oils. The surface active dispersing agents are usually employed in the liquid dispersions and aqueous emulsions in the amount of from about 1 to about 20 percent by weight of the combined weight of the dispersing agent and the active toxicant.

When operating in accordance with the present invention, the tin compound or a composition containing the compound can be applied directly to the undesirable organism when mites are being controlled, or to their habitat or food in any convenient fashion, i.e. by means of hand dusters or sprayers or by simple mixing with the food to be ingested by the mites. Applications to the foliage of plants is conveniently carried out using power dusters, boom sprayers and spray dusters. In such applications, when it is desirable to benefit the plants, the employed compositions should not contain substantial amounts of phytotoxic diluents. In large scale operations, dusts or low volume sprays may be applied from an aircraft.

The following examples represent the bestembodiments of the present invention now known, and tell how to practice them.

EXAMPLE 1

This example discloses the preparation of tris(cyclohexylmethyl)tin bromide

A. Preparation of tetrakis(cyclohexylmethyl)tin

A 14.4 g. (0.6 mole) portion of magnesium chips was placed in a reactor equipped with a motor driven agitator, reflux condenser, addition funnel, thermometer, and nitrogen inlet. A 10 c.c. portion of a solution containing 88.5 g. (0.5 mole) cyclohexylmethyl bromide and 250 c.c. dry tetrahydrofuran was then added to the reactor, the mixture heated to 40°C. and the reaction initiated by the addition of a few drops of ethylene dibromide. The remainder of the cyclohexylmethyl bromide solution was added drop-wise during a one hour period during which the reaction mixture was heated to reflux temperature. Heating was continued for 0.75 hours following completion of the addition, at which time 156 c.c. of dry tetrahydrofuran were added to prevent precipitation of the product (cyclohexylmethyl magnesium bromide) and the contents of the reactor were allowed to cool. The liquid phase of the reaction mixture was transferred to a reactor equipped as previously described. A solution containing 26.1 g. (0.1 mole) of stannic chloride and 250 c.c. of anhydrous toluene was gradually added to the contents of the reactor over one hour while the temperature was maintained between 25° and 40°C. The reaction mixture was heated to reflux temperature for two hours following completion of the addition, then was allowed to cool to ambient temperature, at which time a solution containing 35 g. of citric acid and 250 c.c. of water was added. The organic phase was separated and dried using anhydrous magnesium sulfate, after which the liquid was concentrated under reduced pressure to yield 51.0 g. (100 percent theoretical yield) of a colorless viscous liquid which upon analysis was found to contain 22.82 percent by weight of tin. The theoretical tin content of tetrakis(cyclohexylmethyl)tin,

is 23.39 percent.

B. Preparation of tris(cyclohexylmethyl)tin bromide via bromine cleavage

A solution containing 16.0 g. bromine, 50 c.c. methanol, and 50 c.c. chloroform was added drop-wise to a solution containing 50.7 g. of the product obtained in part A of this example, 35 c.c. methanol and 90 c.c. chloroform. The addition required 3.25 hours, during which time the temperature of the reaction mixture was maintained at 0°C. Each drop of bromine was added only after the color imparted by the preceeding drop had disappeared. Following completion of the addition the resultant orange solution was concentrated under reduced pressure. The solid residue was comminuted and washed using 250 c.c. of methanol. The solid material remaining following separation of the methanol was white in color and weighed 41.0 g. (83.7 percent of theoretical yield). Following one recrystallization from ethanol, the material melted between 80° and 81°C. and was found to contain 24.45 weight percent tin [theoretical value for tris(cyclohexylmethyl)tin bromide = 24.22%] and 16.22 percent bromine (theoretical value = 16.30 percent).

EXAMPLE 2

Preparation of bis[tris(cyclohexylmethyl)tin] oxide and tris(cyclohexylmethyl)tin acetate The corresponding oxide was prepared by adding a solution containing 4.0 g. (0.1 mole) sodium hydroxide, 50 c.c. water and 50 c.c. methanol to a boiling solution containing 24.5 g. (0.05 mole) tris(cyclohexylmethyl)tin bromide and 200 c.c. methanol. Following completion of the addition the resultant mixture was heated at the boiling point for two hours, then allowed to cool to ambient temperature. The resultant two-phase liquid composition was extracted using 2-100 c.c. portions of diethyl ether and the combined ether layers dried using anhydrous magnesium sulfate. The ether was then removed under reduced pressure, yielding a viscous oil that was found to contain 27.84 percent by weight of tin (theoretical value for the oxide is 28.38 percent). The results of a potentiometric titration indicated a product purity of 98.6 percent.

The acetate derivative was obtained by blending 8.36 g. (0.01 mole) of the aforementioned oxide with 1.89 g. (0.015 mole) of glacial acetic acid. The reaction mixture was then stored for 72 hours under reduced pressure in a vessel which contained a quantity of sodium hydroxide for the purpose of absorbing and neutralizing the excess acetic acid. During storage the reaction mixture was converted to a dry white solid which following one recrystallization from methanol, exhibited a melting range betwee 82° and 84°C. and a tin content of 25.52 weight percent (theoretical value for the acetate = 25.29 percent).

EXAMPLE 3

Preparation of Tris(cyclohexylpropyl)tin Derivatives

Tris(cyclohexylpropyl)tin bromide,

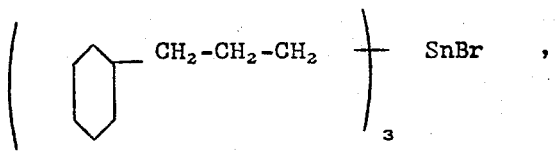

was prepared by reacting the corresponding tetrakis compound with bromine. The tetrakis compound was, in turn, obtained by reacting cyclohexylpropyl magnesium bromide with stannic chloride using the conditions described in Example 1-A, with the exception that the reaction mixture resulting from the addition of the stannic chloride was maintained at ambient temperatures for about 16 hours, after which it was heated to boiling for about one hour.

The tetrakis compound was reacted with bromine as described in Example 2-B. Following completion of the bromine addition, the reaction mixture was concentrated under reduced pressure. The material removed included 4.5 g. of cyclohexylpropyl bromide formed as a by-product of the reaction. The residue remaining following the concentration process was combined with 75 c.c. of benzene, 1 g. of activated charcoal and heated to boiling for about 15 minutes. The hot mixture was then filtered and the benzene removed under reduced pressure to yield 19.4 g. (98 percent yield) of a clear, yellow liquid that was found to contain 20.83 percent tin (theoretical value for the bromide = 20.60%).

BIOLOGICAL ACTIVITY OF TRIS(CYCLOHEXYALKYL)TIN DERIVATIVES

1. General Evaluation Methods

The triorganotin compounds of this invention were evaluated in the form of sprayable compositions prepared by dissolving or dispersing them in a 90/10 weight ratio water/acetone mixture containing a small amount of a non-ionic surfactant. The resultant stock solutions or dispersions were then diluted using a water-surfactant mixture to obtain the desired concentration of tin compound while maintaining the surfactant concentration at 100 parts per million (ppm). Samples which proved difficult to emulsify were homogenized using a colloid mill or tissue homogenizer.

2. Evaluation of the Effectiveness of Tris(cyclohexylalkyl)tin Compounds Against Specific Organisms The efficacy of the triorganotin compounds of this invention are fungicides and miticides was investigated and the results are summarized in the following section. The test organisms employed were:

Fungi: powdery bean mildew, leaf spot of rice (helminthosporium), apple mildew, and apple scab.
Mites: two-spotted spider mite The rating system employed to determine control of the organisms was based on a numerical scale wherein a rating of 10 indicated 100 percent control (no surviving organisms) and a rating of 0 indicated no control, i.e. the plant was heavily infested with the organism. The control rating employed for fungi is a function of the fraction of total leaf area which is unaffected by the fungus.

A. Powdery Bean Mildew

Tender green bean plants with fully expanded primary leaves are innoculated with spores of the powdery mildew fungus (erysiphe polygoni) 48 hours prior to the application of tris(cyclohexylmethyl)tin bromide. The tin compound is applied at the concentrations indicated in the following table by placing the plants on a revolving turntable and spraying them with the formulation containing the triorganotin compound. When the spray deposit dries, the plants are placed in a greenhouse for between 7 and 10 days, at which time the amount of mildew on the primary leaves is rated. Plants not treated with any of the formulations serve as controls, which exhibit a rating of 0. The formulations tested contained 100, 50, and 25 parts per million (ppm) of tris(cyclohexylmethyl)tin bromide.

| CONCENTRATION OF TIN COMPOUND (P.P.M.) | CONTROL RATING |
| --- | --- |
| 100 | 10 |
| 50 | 7.3 |
| 25 | 6.3 |

The tris(cyclohexylpropyl)tin bromide exhibited a control rating of 8 at a concentration of 100 parts per million.

None of the formulations tested damaged the bean plant to any significant extent.

B. Leaf Spot of Rice (helminthosporium)

Rice plants are sprayed with a formulation containing 100 parts per million of tris(cyclohexylmethyl)tin bromide. As soon as the spray has dried, the plants are innoculated with a spore suspension of helminthosporium and placed in an incubation chamber for 24 hours, after which they are removed and held until lesions have developed. As in part A, plants not treated with the tin compound serve as a control, which exhibited a rating of 0, while the treated plants exhibited a rating of 9.

C. Apple Mildew

Apple seeds which had been stored at 4°C. for 60 days were then planted in pasteurized soil. When the seedlings were in the fifth leaf stage, the plants were sprayed with formulations containing tris(cyclohexylmethyl) tin bromide, after which they were placed among apple seedlings which were heavily mildewed. The sprayed plants were rated with regard to mildew development 15 days after the initial exposure, following which the plants were again sprayed. Ratings were made 20 and 35 days after the first spraying).

| CONCENTRA-TION (P.P.M.) | DAYS FOLLOWING INITIAL SPRAYING | CONTROL RATING |
| --- | --- | --- |
| 250 | 15 | 8.1 |
| | 35 | 7.0 |
| | 50 | 4.7 |
| 50 | 15 | 7.3 |
| | 35 | 5.2 |
| | 50 | 2.3 |
| 10 | 15 | 4.0 |
| | 35 | 1.7 |
| | 50 | 2.3 |

D. Apple Scab

Frozen apple leaves which were infested with conidia spores were soaked in cool water for about 30 minutes, following which the liquid phase was filtered through a single layer of cheesecloth. A number of apple seedlings in the fifth leaf stage were sprayed with the water containing the dispersed conidia spores. The seedlings were stored in a high humidity environment [relative humidity (R.H.) = 100 percent] at ambient temperature for two days, after which they were stored at a temperature of 24° ± 3°C. for seven days, then in the high humidity environment for between one and two days, and finally at 24° ± 3°C. for 10 to 15 days, during which time the infested leaves were harvested. The leaves were extracted with cool water to prepare a stock solution which when viewed under a microscope at 100 × magnification exhibited a field containing not less than 20 conidia spores.

The plants to be tested were sprayed with a liquid formulation containing tris(cyclohexylmethyl)tin bromide. The formulation was prepared as previously described. After the solvent was evaporated the leaves were sprayed with the suspension of conidia spores prepared as described in the preceeding paragraph. The plants were then placed in a high humidity (100 percent R.H.) environment at ambient temperature for two days, after which they were stored under conditions of ambient humidity and a temperature of 24° ± 3°C. until evidence of apple scab was observed on the untreated control, as indicated by brownish lesions on the leaves. The results of the test are summarized below.

| CONCENTRATION OF TIN COMPOUND IN SPRAY FORMULATION (P.P.M.) | CONTROL RATING |
| --- | --- |
| 250 | 8.3 |
| 50 | 7.0 |
| 12.5 | 6.8 |
| 0 (control) | 0 |

E. Two-spotted Spider Mite

Bean plants were sprayed with formulations containing tris(cyclohexylmethyl)tin bromide at concentrations of 50 and 200 p.p.m. Between one and three days following the spraying a number of nymph stage and adult spider mites were transferred onto the upper surface of the plant leaves. The plants remained undisturbed at 24° ± 3°C. for between 12 and 14 days following exposure to the mites, at which time the percentages of dead nymphs and adult mites were observed and the results recorded as the initial control test. The long-term effect of the tin compound was evaluated by placing a new supply of adult and nymph stage mites onto the bean plant leaves following the initial observations. No additional triorganotin compound was applied. The percentages of dead nymph and adult mites were again observed between 12 and 14 days following the second application of spider mites, and the results recorded as the residual control test.

| CONCENTRATION OF TIN COMPOUND IN SPRAY (P.P.M.) | INITIAL CONTROL | RESIDUAL CONTROL |
| --- | --- | --- |
| 200 | 9.4 (A); 5.1 (N) | 9.3 (A); 9.3 (N) |
| 50 | 2.6 (A); 3.1 (N) | 2.5 (A); 3.9 (N) |

A = adult mites; N = nymph stage mites

None of the spray formulations employed in any of the preceeding tests caused significant damage to the plants. Although all of the compounds employed to determine biological activity were triorganotin bromides, other derivatives including fluorides, chlorides, hydroxides, carboxylates, mercaptides, alkoxides, phenoxides, oxides, sulfides and sulfates are expected to be at least equally efficacious in combatting fungi and mites since it has been shown that the anionic radical of the present triorganotin compounds, represented by X and Y in the foregoing generic formulae, have little, if any, effect on the degree of biological activity exhibited by the compound unless the anion itself possesses significant biological activity.

What is claimed is:

1. A method for controlling organisms selected from the group consisting of fungi and mites which comprises contacting said organisms with a fungicidally and miticidally effective amount of a compound of the formula

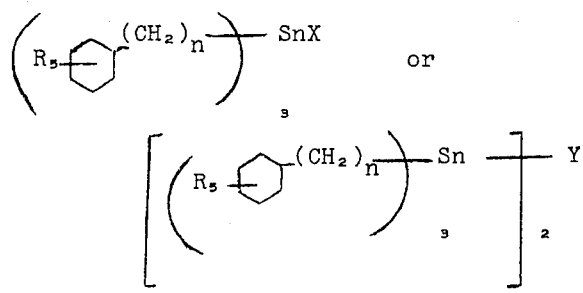

wherein each R is individually selected from the group consisting of hydrogen linear alkyl containing between 1 and 8 carbons and branched alkyl containing between 1 and 8 carbons, X is selected from the group consisting of chlorine, bromine, fluorine, hydroxyl, carboxylate (—OOCR'), phenoxy, alkoxy (—OR'), and mercaptide (—SR') wherein R' is alkyl containing between 1 and 12 carbons, inclusive, Y is selected from the group consisting of oxygen, sulfur and sulfate and $n$ is an integer between 1 and 5, inclusive.

2. A method according to claim 1 wherein each R is hydrogen.

3. A method according to claim 1 wherein X is bromine, chlorine or acetate.

4. The method of claim 1 wherein Y is oxygen.

5. The method of claim 1 wherein $n$ is 1, 2, or 3.

6. The method of claim 1 wherein the compound is applied to a plant which is subject to attack by said organisms.

* * * * *